(12) United States Patent
Shaw et al.

(10) Patent No.: US 9,530,307 B2
(45) Date of Patent: Dec. 27, 2016

(54) SYSTEM AND METHOD FOR TRANSMITTING SENSOR DATA FROM A ROTATING COMPONENT OF A TURBOMACHINE

(71) Applicant: General Electric Company, Schenectady, NY (US)

(72) Inventors: Donald W. Shaw, Simpsonville, SC (US); Kurt Kramer Schleif, Greenville, SC (US); Mario Joseph Arceneaux, Simpsonville, SC (US); Michael Allen Ball, Mount Juliet, TN (US)

(73) Assignee: General Electric Company, Schenectady, NY (US)

( * ) Notice: Subject to any disclaimer, the term of this patent is extended or adjusted under 35 U.S.C. 154(b) by 65 days.

(21) Appl. No.: 14/599,587

(22) Filed: Jan. 19, 2015

(65) Prior Publication Data

US 2016/0210845 A1 Jul. 21, 2016

(51) Int. Cl.
*G08C 19/22* (2006.01)
*G08C 17/02* (2006.01)
(Continued)

(52) U.S. Cl.
CPC .............. *G08C 17/02* (2013.01); *F01D 17/085* (2013.01); *F01D 25/00* (2013.01); *F02C 3/00* (2013.01);
(Continued)

(58) Field of Classification Search
CPC ..... B24B 37/013; B60L 2220/44; G08C 17/02
(Continued)

(56) References Cited

U.S. PATENT DOCUMENTS 4,893,261 A * 1/1990 Flint, III ................. G01P 13/02
244/17.13
5,485,822 A * 1/1996 Hirose ................ F02D 35/0007
123/357
(Continued)

FOREIGN PATENT DOCUMENTS

WO 9306573 A1 4/1993

OTHER PUBLICATIONS

European Search Report and Opinion issued in connection with corresponding EP Application No. 16150896.5 on Jun. 15, 2016.

*Primary Examiner* — Don N Vo
(74) *Attorney, Agent, or Firm* — Dority & Manning, PA (57) ABSTRACT

A system for transmitting data from a rotating component of a turbomachine includes a plurality of thermal sensors coupled to corresponding rotatable components within the turbomachine where each thermal sensor generates a discrete analog signal indicative of temperature. A plurality of transmitter assemblies is coupled to an end of a rotor shaft of the turbomachine. The plurality of transmitter assemblies comprises a first transmitter assembly and a second transmitter assembly. The first transmitter assembly is configured to receive the discrete analog signals from the plurality of thermal sensors, multiplex the plurality of discrete analog signals into a single amplifier and an analog-to-digital converter to generate a single stream of digital data therefrom. The system also includes a slip ring assembly having a plurality of conductive rings where at least one of the conductive rings defines a digital signal path between the first transmitter assembly and a data acquisition system.

18 Claims, 7 Drawing Sheets

(51) Int. Cl.
*F02C 3/00* (2006.01)
*G08C 19/02* (2006.01)
*H04Q 9/00* (2006.01)
*F01D 25/00* (2006.01)
*F01D 17/08* (2006.01)
*H01R 39/08* (2006.01)

(52) U.S. Cl.
CPC ............... *G08C 19/02* (2013.01); *H04Q 9/00* (2013.01); *F05D 2270/303* (2013.01); *H01R 39/08* (2013.01); *H04Q 2209/30* (2013.01)

(58) Field of Classification Search
USPC .................................................. 340/870.07
See application file for complete search history.

(56) References Cited

U.S. PATENT DOCUMENTS

| | | | |
|---|---|---|---|
| 5,665,043 A | * | 9/1997 | Hasselberg ............ G01K 13/08 219/211 |
| 5,952,762 A | | 9/1999 | Larsen et al. |
| 2005/0062864 A1 | | 3/2005 | Mabuchi |
| 2007/0166148 A1 | * | 7/2007 | Middleton ............ F04D 29/005 415/118 |
| 2012/0116723 A1 | | 5/2012 | Shaw et al. |
| 2014/0052410 A1 | | 2/2014 | Tralshawala et al. |
| 2016/0118787 A1 | * | 4/2016 | Ran ........................ A61L 9/22 422/121 |

* cited by examiner

SYSTEM AND METHOD FOR TRANSMITTING SENSOR DATA FROM A ROTATING COMPONENT OF A TURBOMACHINE

FIELD OF THE INVENTION

The present invention generally involves a system and method for transmitting sensor data from a rotating component of a turbomachine to a stationary data acquisition device.

BACKGROUND OF THE INVENTION

Turbomachines such as wind turbines, gas turbines, steam turbines, pumps, fans, generators, motors, and other forms of commercial equipment frequently include shafts, blades, and other rotating components. It is known in the art to install one or more sensors on the rotating components to measure various characteristics of those components in order to control, monitor, and/or enhance the operation of the rotating components. For example, sensors that measure temperature, velocity, stress, strain, vibrations, and/or other characteristics of the rotating components may allow for early detection of abnormalities, adjustments to repair or maintenance schedules, and/or other actions to enhance operations.

Various slip ring and telemetry systems exist in the art for transmitting the analogue sensor data from the rotating components to stator components for further analysis. Conventionally, analogue signals from the sensors are routed via wires to individual slip or conductive rings positioned concentrically along a rotatable center bore or shaft portion of a slip ring assembly. Stationary contact arms or brushes then provide a signal path for routing the signals from the rotating contact or slip rings to a controller, data processor or the like. However, the volume of analog data that can be transferred through each conductive ring is relatively limited compared to the number of sensors that may exist on each rotating component.

A telemetry system, on the other hand, may include circuitry on the rotating component that packages the sensor data into a compressed data stream. A transmitter on the rotating component may then transmit the compressed data stream from the rotating component to a nearby stationary loop antenna. In this manner, each transmitter in the telemetry system may transmit larger volumes of sensor data than could be transmitted through slip rings. Although telemetry systems generally provide increased data transmission capabilities compared to conventional slip ring systems, telemetry systems also have their limitations such as costs and/or effects that are inherently present with rotating components such as vibrations, electromagnetic interference that may result in signal interference.

As a result, continued improvements in systems and methods for transferring data from rotating instrumentation of a turbomachine such as a gas turbine to a stationary data acquisition system would be useful.

BRIEF DESCRIPTION OF THE INVENTION

Aspects and advantages of the invention are set forth below in the following description, or may be obvious from the description, or may be learned through practice of the invention.

One embodiment of the present invention is a system for transmitting data from a rotating component of a turbomachine. The system includes a plurality of thermal sensors. Each thermal sensor is coupled to a corresponding rotatable component within the turbomachine. Each thermal sensor generates a discrete analogue signal indicative of temperature at the corresponding rotatable component. The system includes a plurality of transmitter assemblies annularly arranged within a carrier shaft and coupled to an end of a rotor shaft of the turbomachine. The plurality of transmitter assemblies comprises a first transmitter assembly and a second transmitter assembly. The first transmitter assembly is configured to receive the discrete analogue signals from the plurality of thermal sensors, multiplex the plurality of discrete analogue signals into a single amplifier and to an analogue-to-digital converter to generate a single stream of digital data therefrom. The system further includes a slip ring assembly that is electronically coupled to the first transmitter assembly and to a data acquisition system. The slip ring assembly includes at least one conductive ring that defines a digital signal path between the first transmitter assembly and the data acquisition system.

Another embodiment of the present invention is a method for transmitting sensor data from a rotating component of a turbomachine. The method includes receiving at a transmitter assembly a plurality of discrete analogue signals from a plurality of thermal sensors where each thermal sensor is coupled to a rotatable component of the turbomachine. The method also includes multiplexing the plurality of discrete analogue signals into a single amplifier and on to an analogue-to-digital converter of the transmitter assembly, and generating a single stream of digital data therefrom. The method further includes transmitting the single stream of digital data over at least one conductive ring of a slip ring assembly to a data acquisition system.

The present invention also includes a method for transmitting sensor data from a rotating component of a turbomachine. The method includes receiving at a transmitter assembly a plurality of discrete analogue signals from a plurality of strain sensors where each strain sensor is coupled to a rotatable component of the turbomachine. The method further includes multiplexing the plurality of discrete analogue signals into a single amplifier and into an analogue-to-digital converter of the transmitter assembly, and generating a single stream of digital data therefrom. The method also includes transmitting the single stream of digital data over at least one conductive ring of a slip ring assembly to a data acquisition system.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention cover such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, and the term "axially" refers to the relative direction that is substantially parallel and/or coaxially aligned to an axial centerline of a particular component.

Although exemplary embodiments of the present invention will be described generally in the context of a gas turbine turbomachine for purposes of illustration, one of ordinary skill in the art will readily appreciate that embodiments of the present invention may be applied to any turbomachine. For example, the invention may be applied to a steam turbine, a wind turbine or the like which includes rotating instrumentation for monitoring various operating conditions and/or hardware condition and the specification is not intended to be limited to a gas turbine turbomachine unless otherwise specified in the claims.

Embodiments of the present invention provide a system and method for transmitting sensor data from a rotating component of a turbomachine. The system and method employ one or more transmitter assemblies annularly arranged within a rotatable carrier shaft to digitize, multiplex, and/or stream a plurality of data signals received from multiple rotatable sensors through conductive rings of a slip ring assembly to a data acquisition system. Each transmitter assembly may be configured by sensor type and/or sensor data sampling rate. Each transmitter assembly is electronically coupled to multiple sensors which may be grouped by sensor type and/or sensor data sampling rate. The transmitter assemblies may be removed from the carrier shaft for repair and/or replacement. In addition, the transmitter assembly may provide a convenient and reliable method for supplying power to the sensors.

Figure 1:
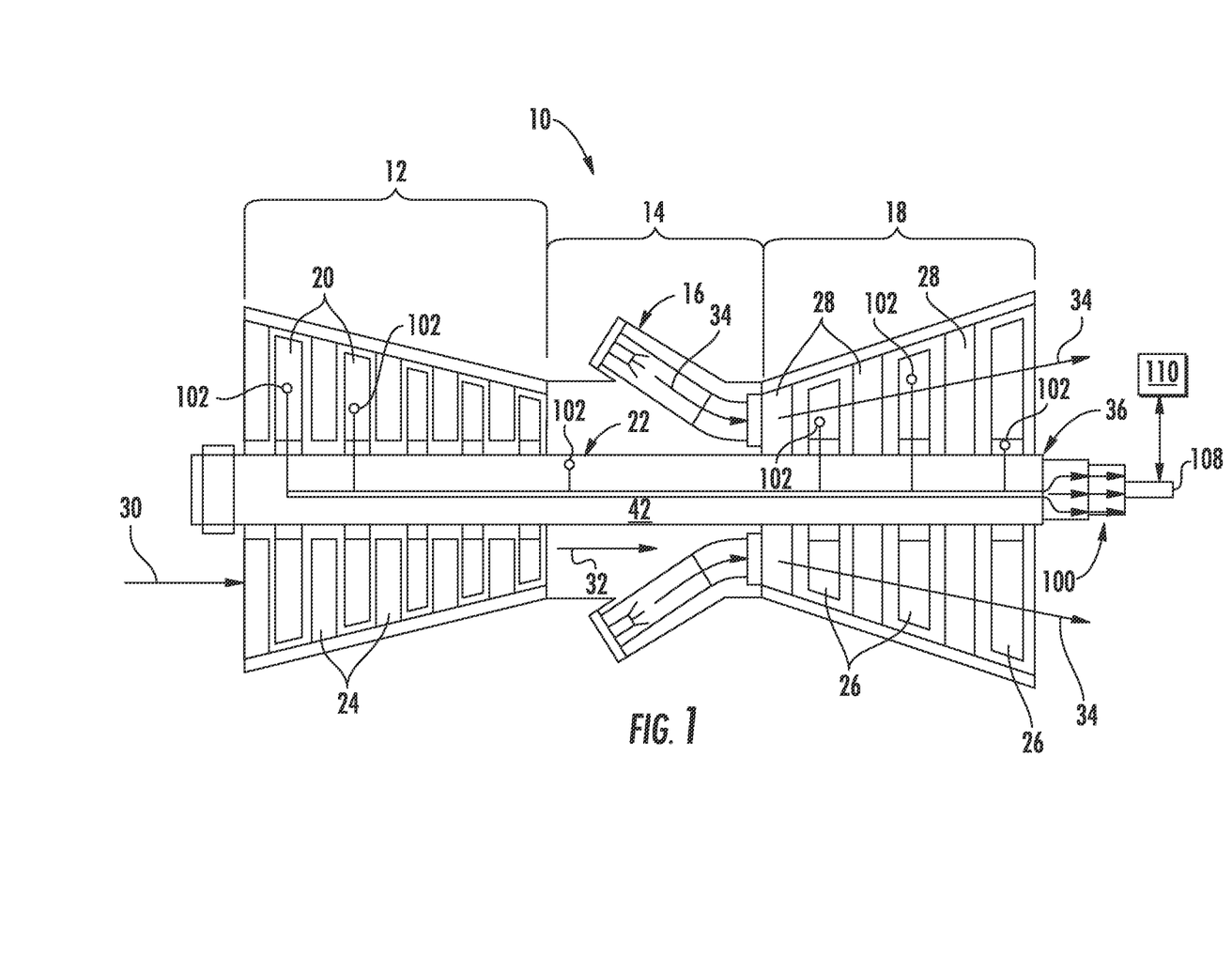
FIG. 1 provides a simplified cross sectioned side view of an exemplary gas turbine turbomachine as may incorporate various embodiments of the present invention.

Referring now to the drawings, wherein like numerals refer to like components, FIG. 1 illustrates an example of a gas turbine 10 turbomachine as may incorporate various embodiments of the present invention. As shown, the gas turbine 10 includes a compressor 12, a combustion section 14 having one or more combustors 16 that are disposed downstream from the compressor 12, and a turbine 18 that is disposed downstream from the combustion section 14. The compressor 12 generally includes multiple rows or stages of compressor rotor blades 20 that are interconnected or coupled to a rotor shaft 22. Sequential rows of stationary vanes 24 are disposed within the compressor 12 between sequential rows of the compressor rotor blades 20. The turbine 18 generally includes multiple rows or stages of turbine rotor blades 26 that are interconnected or coupled to the rotor shaft 24. Sequential rows of stationary vanes 28 are disposed within the turbine 18 between sequential rows of the turbine rotor blades 26.

In operation, a working fluid 30 such as air enters the compressor 12. The working fluid 30 is progressively compressed as it routed through the compressor 12 towards the combustor(s) 16 of the combustion section 14 to provide a compressed working fluid 32 to the combustor(s) 16. Fuel is mixed with the compressed working fluid 32 within each combustor 16 and the mixture is burned to produce combustion gases 34 at a high temperature and a high velocity. The combustion gases 34 are routed from the combustor(s) 16 across a first row of the stationary vanes 28 and into the turbine 18. Thermal and/or kinetic energy is extracted from the combustion gases 34 via the turbine rotor blades 26, thereby causing the rotor shaft 22 to rotate.

During operation of the gas turbine 10, the various rotatable components such as the compressor rotor blades 20, the turbine rotor blades 26, the rotor shaft 22 and various other rotatable components are exposed to potentially life limiting thermal and/or mechanical stresses. As a result, it is generally desirable to monitor various operating parameters such as temperature, velocity, stress, strain, vibrations, and/or other characteristics of the rotating components which may allow for detection of abnormalities, allow for adjustments to repair or maintenance schedules, and/or other actions to enhance operation and/or efficiency of the turbomachine such as the gas turbine 10.

In order to monitor the operating parameters and/or conditions at the various rotatable components, it is necessary to collect data related to the various operating parameters and/or conditions such as temperature, velocity, stress, strain and/or vibrations. This data is generated by rotatable sensors or other electronic instrumentation that is coupled to the rotatable components and collected by a data acquisition system. The data is transmitted from the rotating rotor shaft 22 to the data acquisition system via a slip ring assembly. In various embodiments of the present invention, a system for transmitting the sensor signals or data to a data acquisition system is provided.

Figure 2:
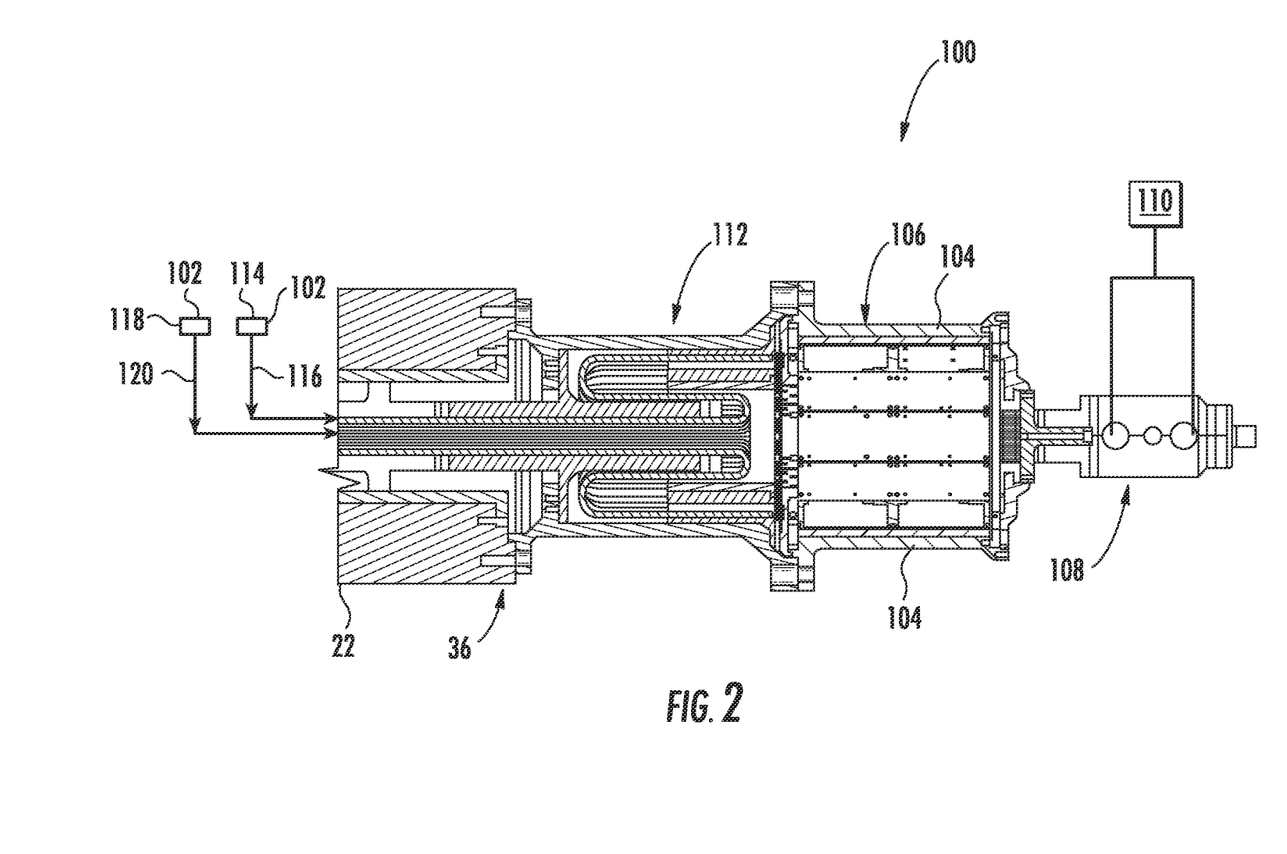
FIG. 2 is a cross sectioned side view of a system for transmitting sensor data from a rotating component of a turbomachine according to various embodiment of the present invention.

FIG. 2 provides a cross sectioned side view of a system 100 for transmitting the sensor signals or data to a data acquisition system according to various embodiments of the present invention. In one embodiment, as shown in FIG. 2, the system 100 is coupled to an end 36 of the rotor shaft 22. As shown in FIG. 1 the system 100 generally includes a plurality of sensors 102 connected to the various rotatable components (FIG. 1) such as but not limited to the compressor rotor blades 20, the rotor shaft 22 and the rotor turbine blades 26 of the gas turbine 10. As shown in FIG. 2, the system 100 further includes a plurality of transmitter assemblies 104 annularly arranged within a carrier shaft 106 that is coupled to the end 36 of the rotor shaft 22, a slip ring assembly 108 electronically coupled to the plurality of transmitter assemblies 104 and a data acquisition system 110 electronically coupled to the slip ring assembly 108. Particular embodiments may further include a wire barrel 112 for coupling the carrier shaft 106 to the rotor shaft 22. As shown in FIG. 2, the transmitter assemblies 104 are generally positioned between the sensors 102 and the slip ring assembly 108 within the carrier shaft 106.

The sensors 102 are configured to monitor one or more characteristics or operating conditions of the compressor rotor blades 20, the rotor shaft 22, the turbine rotor blades or other rotatable components coupled to the rotor shaft 22. The sensors 102 may comprise pressure detectors, strain gauges, or accelerometers that generate one or more signals reflective of vibrations or movement by the compressor rotor blades 20, turbine rotor blades 26 and/or other rotating components coupled to or a part of the rotor shaft 22 such as compressor or turbine rotor disks which couple the compressor rotor blades 20 and turbine rotor blades 26 to the rotor shaft 22. In addition or in the alternative, the sensors 102 may comprise thermocouples or resistance temperature detectors that generate one or more signals reflective of the temperature of the various rotating components and/or the operating environment surrounding those rotating components. One of ordinary skill in the art will readily appreciate that embodiments of the present invention are not limited to any particular sensor unless specifically recited in the claims.

As shown in FIG. 1, the sensors 102 may be placed on any one, each or any combination of the compressor rotor blades 20, turbine rotor blades 26 and the rotor shaft 22 or on any rotatable component connected to or disposed within the rotor shaft 22 such as the compressor or turbine rotor disks which couple the compressor rotor blades 20 and turbine rotor blades 26 to the rotor shaft 22. Each sensor 102 may be electronically coupled to a corresponding transmitter assembly 104 via wires. The wires may be bundled into a plurality of common wire bundles which extend through an inner passage 42 of the rotor shaft 22 and out the end 36 of the rotor shaft 22.

In one embodiment, the sensors 102 comprise strain or SG sensors 114 that are configured to generate one or more discrete analogue signals 116 reflective of vibrations or movement of the compressor rotor blades 20, turbine rotor blades 26, or other rotating components connected to or disposed within the rotor shaft 22 such as the compressor or turbine rotor disks which couple the compressor rotor blades 20 and turbine rotor blades 26 to the rotor shaft 22. In particular embodiments, the strain sensors 114 may include strain gauges, pressure detectors or accelerometers. In other embodiments, the sensors 102 may comprise thermal or TC sensors 118 such as thermocouples or resistance temperature detectors that generate one or more discrete analogue signals 120 reflective of the temperature of the various rotating components. One of ordinary skill in the art will readily appreciate that embodiments of the present invention are not limited to any particular sensor unless specifically recited in the claims.

Figure 3:
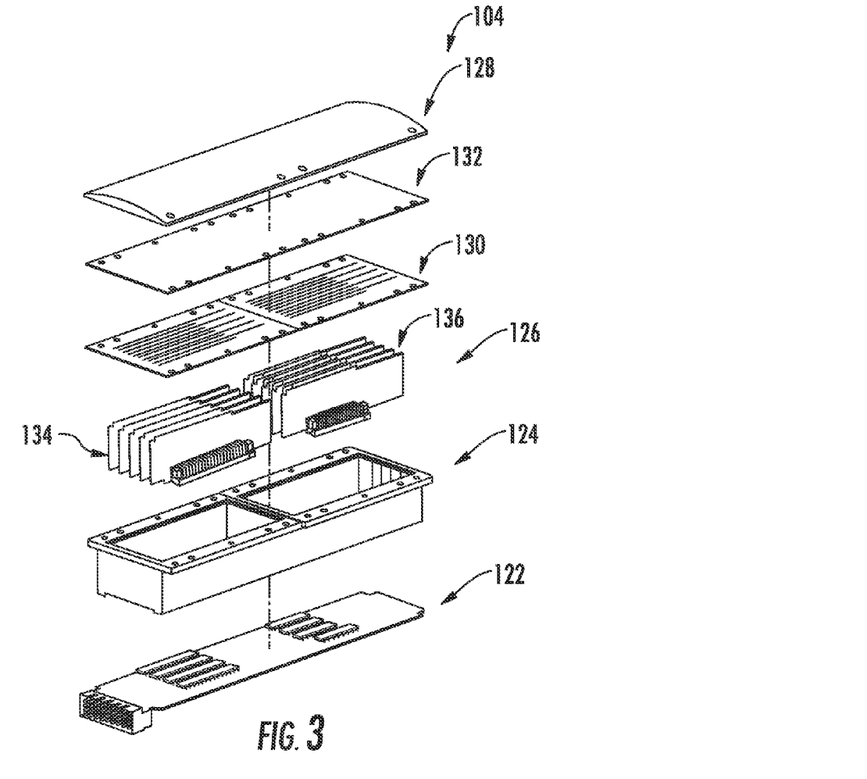
FIG. 3 is an exploded view of an exemplary transmitter assembly according to one or more embodiments of the present invention.

FIG. 3 provides an exploded view of an exemplary transmitter assembly 104, according to one or more embodiments of the present invention. In one embodiment, as shown in FIG. 3, the transmitter assembly 104 generally includes a daughterboard 122, a housing 124, a plurality of transmitter circuit boards 126 and a housing lid 128. In further embodiments, each transmitter assembly 104 may include a partition plate 130 which separates the various transmitter circuit boards 126 and/or a shim 132 for securing the transmitter circuit boards 126 against the lid 128.

In one embodiment, the plurality of transmitter circuit boards 126 of at least one of the transmitter assemblies 104 may include a plurality of thermal of TC transmitter circuit boards 134 and a plurality of strain or SG transmitter circuit boards 136. In particular embodiments, the plurality of transmitter circuit boards 126 of at least one of the transmitter assemblies 104 may comprise all strain (SG) transmitter circuit boards 136. In particular embodiments, the plurality of transmitter circuit boards 126 of at least one of the transmitter assemblies 104 may comprise all thermal (TC) transmitter circuit boards 134.

Figure 4:
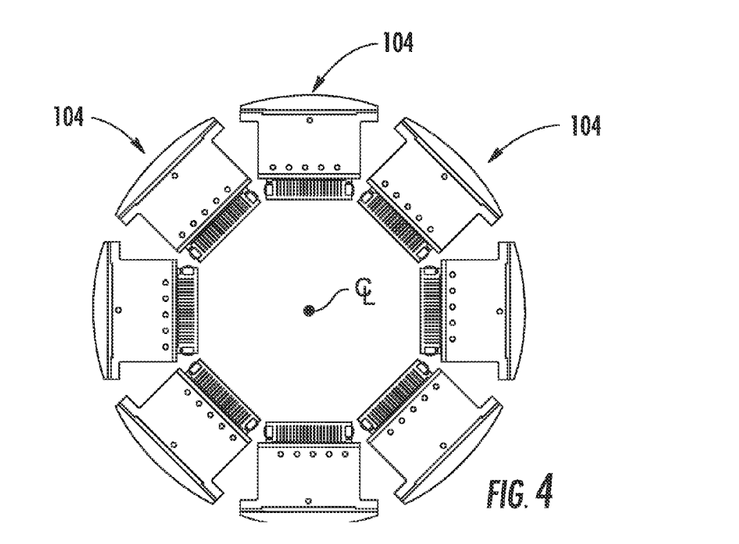
FIG. 4 is a front view a plurality of transmitter assemblies as shown in FIG. 3 removed from a carrier shaft for clarity and annularly arranged about a common center line according to one embodiment of the present invention.

FIG. 4 provides a front view of the plurality of transmitter assemblies 104 removed from the carrier shaft 106 for clarity and annularly arranged about a common center line according to one embodiment of the present invention. As shown in FIG. 4, the transmitter assemblies 104 may be arranged such that every other transmitter assembly 104 is configured to have a plurality of thermal or (TC) transmitter circuit boards 134 and a plurality of strain or (SG) transmitter circuit boards 136 while the remaining transmitter assemblies comprise all strain or (SG) transmitter circuit boards (TC) 136. In other embodiments, all transmitter assemblies 104 may comprise of all transmitter circuit boards (TC) 136.

As described herein, the transmitter assemblies 104 may comprise hardwired logic, a processor, microprocessor, controller, microcontroller, or other embedded circuitry adapted in any suitable manner to provide the desired functionality. For instance, one or more processors may be adapted to provide the described functionality by responding to commands sent by the user through control software. However, the transmitter assemblies 104 discussed herein are not limited to any particular hardware or software architecture or configuration, and a different transmitter assembly 104 may be used for each type of sensor 102 being used. For example, as will be understood by those of ordinary skill in the art without required additional detailed discussion, some systems and methods set forth and disclosed herein may also be implemented by hard-wired logic or other circuitry, including, but not limited to, application-specific circuits. Of course, various combinations of computer-executed software and hard-wired logic or other circuitry may be suitable as well.

Figure 5:
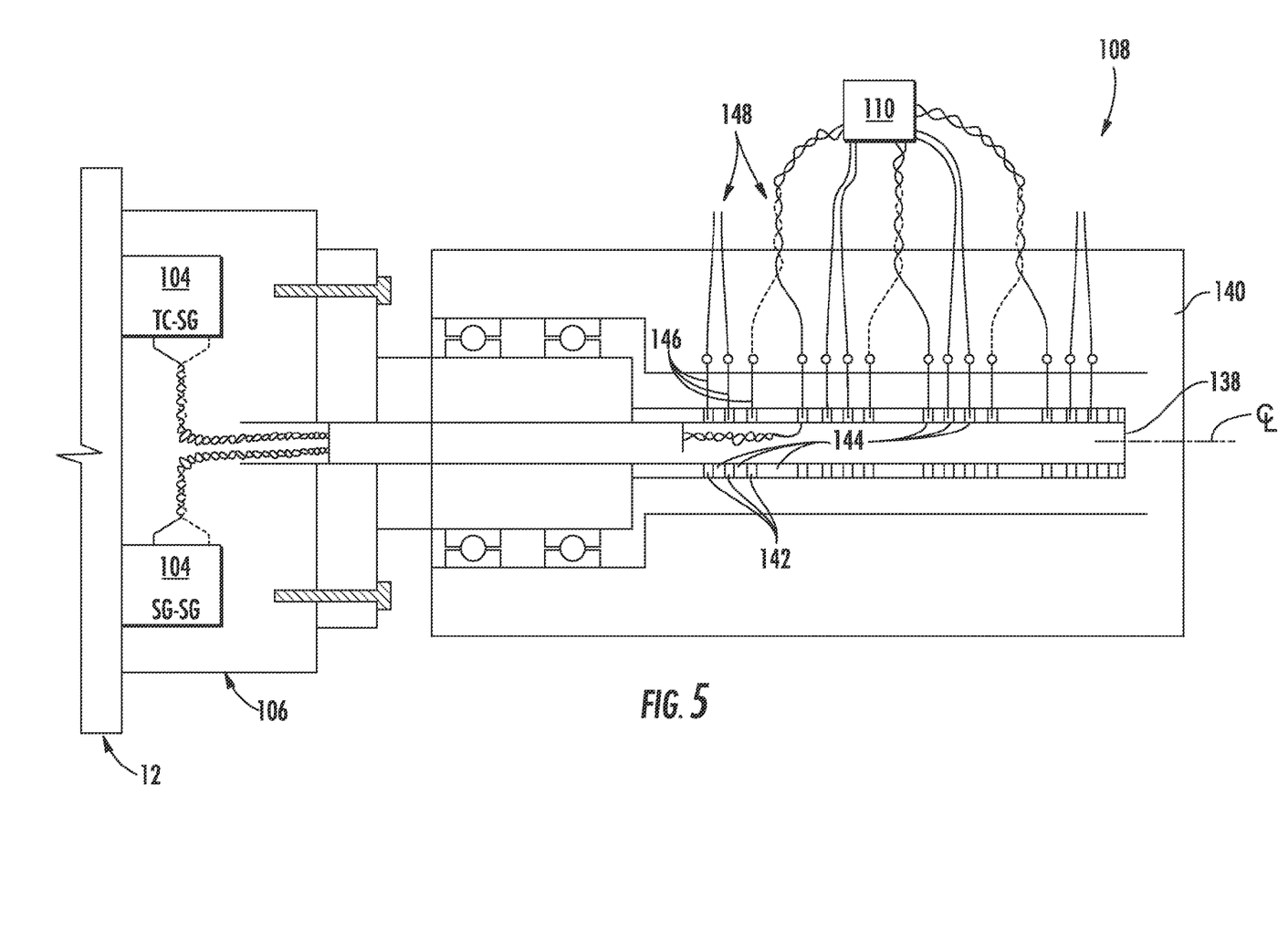
FIG. 5 is a partial cut away side view of a portion of an exemplary slip ring assembly as may be incorporated into one or more embodiments of the present invention.

FIG. 5 provides a partial cut away side view of a portion of an exemplary slip ring assembly 108 as may be incorporated into one or more embodiments of the present invention. As shown in FIG. 2, the slip ring assembly 108 generally includes a rotatable center shaft 138 that is circumferentially surrounded by a stator or stationary portion 140. The center shaft 138 is coupled at one end to the carrier shaft 106. In particular embodiments, the center shaft 138 is concentrically aligned with carrier shaft 106. The center shaft 138 rotates with the carrier shaft 106 and the rotor shaft 22 during operation of the gas turbine 10.

A plurality of conductive rings 142 are concentrically aligned and axially spaced along the center shaft 138. At least some of the conductive rings 142 are used to transfer signals from the sensors 102, 114, 118 through the slip ring assembly 108 and on to the data acquisition system 110. At least some of the conductive rings 142 may be used to transfer power or other information/data to one or more of the transmitter assemblies 104. Each conductive ring 142 may be axially separated from adjacent conductive rings 142 by an electrically insulating material 144. The slip ring assembly 108 may further comprise multiple brushes or contact members 146 that are fixedly connected to the stator portion 140. Each contact member 146 is aligned with a corresponding conductive ring 142 and is configured to slideably engage with the corresponding conductive ring 142, thus defining a signal or current path between one or more of the transmitter assemblies 104 and the data acquisition system 110. In various embodiments, the contact members 146 are electronically coupled to the acquisition system 110 and/or a power supply or other electronic device.

Figure 6:
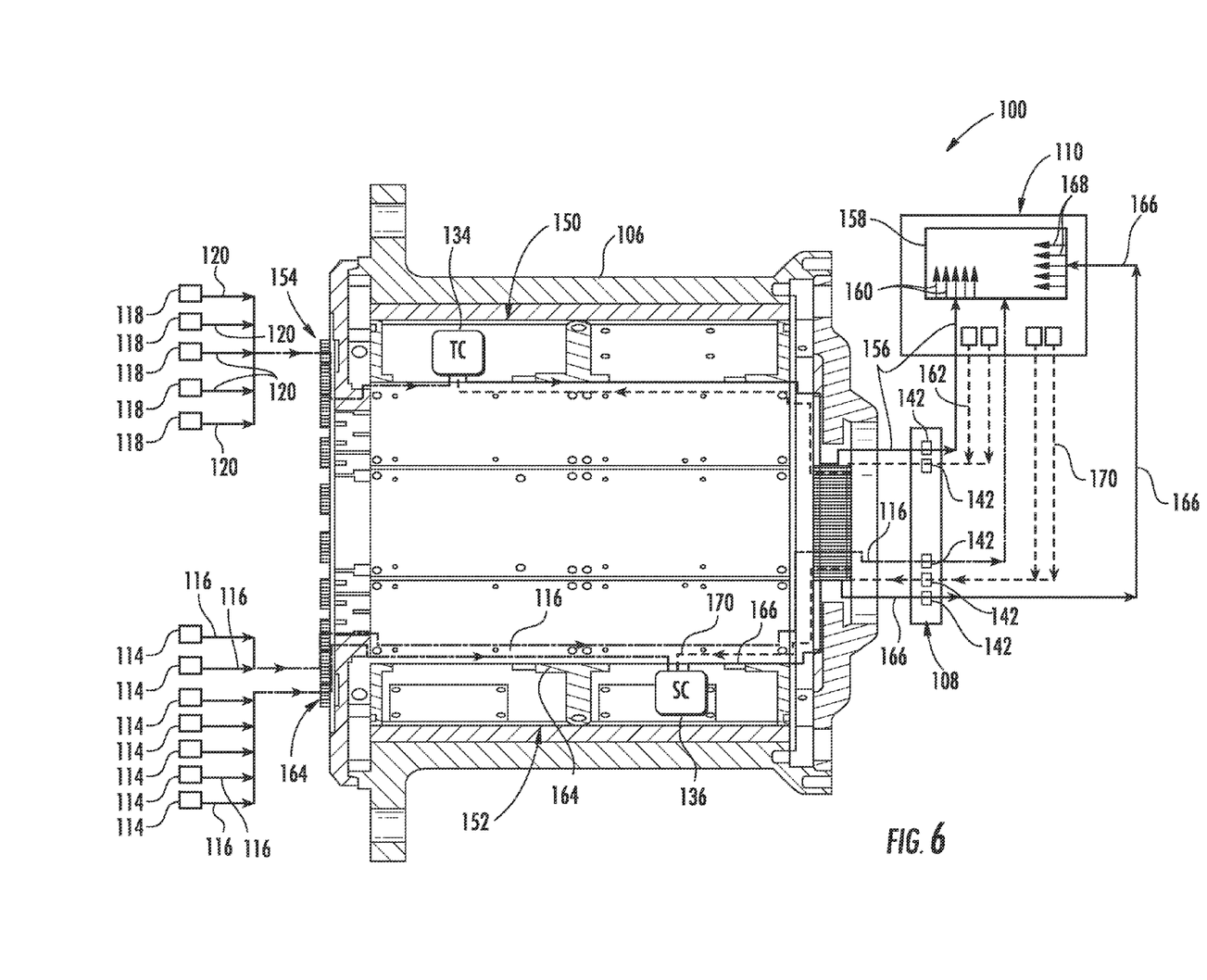
FIG. 6 is a cross sectioned side view of a portion of the system as provided in FIG. 2, including a carrier shaft, a first transmitter assembly and a second transmitter assembly in operation, according to various embodiments of the present invention.

FIG. 6 is a cross sectioned side view of a portion of the system 100 including the carrier shaft 106 and a first transmitter assembly 150 and a second transmitter assembly 152 of the plurality of transmitter assemblies 104 in operation, according to various embodiments of the present invention. In one embodiment, the first transmitter assembly 150 is configured to transmit and/or process the discrete analog signals 120 from the thermal sensors 118. The second transmitter assembly 152 is configured to transmit and/or process the discrete analog signals 116 from the strain sensors 114.

Either or both of first and second transmitter assemblies 150, 152 may be configured to receive the discrete analog signals 120, 116 from the thermal or the strain sensors 118, 114 and process or format the discrete analog signals 120, 116 for transmission across a corresponding conductive ring or rings 142 (FIG. 5) of the slip ring assembly 108. For example, either or both of first and second transmitter assemblies 150, 152 may receive discrete analog signals 120, 116 from the thermal and strain sensors 118, 114 and convert the discrete analog signals 120, 116 into digital signals, binary signals, or other base system formatted signals.

The first and/or second transmitter assemblies 150, 152 may further multiplex multiple digitized signals into a single stream of digital data. For example, the first and second transmitter assemblies 150, 152 may convert discrete analog signals 120 from the thermal sensors 118 to a digital value of between 0-2.3 volts and the discrete analog signals 116 from the strain sensors 114 to a digital value of between 2.6-5 volts. The first and/or second transmitter assemblies 150, 152 may then multiplex the multiple digitized signals from the thermal and strain sensors 118, 114 into a single stream of alternating data formats for transmission through a corresponding conductive ring 142. In this manner, a single stream of data transmitted through a single conductive ring 142 may include information from Thermal sensors 118 and/or multiple Strain sensors 114 positioned at various locations within the gas turbine 10.

The first and/or second transmitter assemblies 150, 152 may be further programmed to determine the sample rate of each or either of the thermal sensors 118 and the strain sensors 114. For example, temperature is generally a relatively slow changing characteristic compared to pressure or vibrations. As a result, first and/or second transmitter assemblies 150, 152 may be programmed to sample the discrete analog signals 120 from the thermal sensors 118 at a much lower frequency than the sample rate of the discrete analog signals 116 from the strain sensors 114. In addition, sensors 102, 114 & 118 on particular regions of the rotating components may require different sample rates. For example, shorter compressor or turbine blades vibrate at a substantially higher frequency than longer compressor or turbine blades. Accordingly, the first and/or second transmitter assembly 150, 152 may be programmed to sample the discrete analog signals 116 indicative of pressure from the strain sensors 114 that are attached to the shorter compressor or turbine blades more often than those attached to the longer compressor or turbine blades.

In one embodiment of the present invention, as shown in FIG. 6, multiple discrete analog signals 120 from the thermal sensors 118 are received at an input 154 such as a multi-pin connector of the first transmitter assembly 150. The discrete analog signals 120 are multiplexed (sequentially switched) into a single amplifier and an analogue to digital converter of the first transmitter assembly 150. A single stream of digital data 156 is "transmitted" over a conductive ring 142 of the slip ring assembly 108 to a corresponding brush or conductive ring 146 (FIG. 5) of the stator portion 140 of the slip ring assembly 108 (FIG. 5). The single stream of digital data 156 may be transmitted at a data rate of less than 10 Mbit/s. A receiver 158 of the data acquisition system 110 receives the single stream of digital data 156 and breaks up or decodes the single stream of digital data 156 into individual channels 160 corresponding to the original values of the analog thermal data signals 120.

Simultaneously, the data acquisition system 110 may transmit a low speed system clock signal 162 through one or more of the slip ring conductive rings 142 to the first transmitter assembly 150. The first transmitter assembly 150 transforms the low speed clock signal 162 to a specified high speed clock value that is used for the analogue-to-digital conversion and for digital synchronization. Voltage regulators (not shown) of the first transmitter assembly 150 may be used to condition unregulated voltage from the data acquisition system 110 so all components of the first transmitter assembly 150 and/or on-shaft components of the system 100 operate within proper voltage ranges. In one embodiment, the data acquisition system 110 is configured to time stamp the single stream of digital data 156 and to transmit the single stream of digital data 156 over a Modbus protocol. In particular embodiments, the settings of the first transmitter assembly 150, sensor tags, cold junction correction data, etc., may also be transmitted first transmitter assembly 150 to the data acquisition system 110 via the slip ring assembly 108.

In addition, during operation, the second transmitter assembly 152 may be configured to provide individual balanced constant current sources to individual channels related to each individual Strain sensor 114 that is linked to the second transmitter assembly 152. The multiple discrete analog signals 116 from the Strain sensors 114 are received at an input 164 such as a multi-pin connector of the second transmitter assembly 152. The resulting multiple discrete analog signals 116 from the Strain sensors 114 are multiplexed (sequentially switched) into a single amplifier and an analogue-to-digital convertor of the second transmitter assembly 152. This results in a single stream of digital data 166 that is "transmitted" over a conductive ring 142 of the slip ring assembly 108 to a corresponding brush or conductive ring 146 (FIG. 5) of the stator portion 140 of the slip ring assembly 108 (FIG. 5). The single stream of digital data 166 may be transmitted at a data rate of at least 10 Mbit/s.

The receiver 158 of the data acquisition system 110 receives the single stream of digital data 166 and breaks up or decodes the single stream of digital data 166 into individual channels 168 corresponding to the original values of the discrete analog signals 116 from the Strain sensors 114. Meanwhile, the receiver 158 transmits a low speed system clock signal 170 through a conductive ring 142 of the slip ring assembly 108 to the SG second transmitter assembly 152. The second transmitter assembly 152 transforms the low speed clock signal 170 to a specified high speed clock that is used for the analogue-to-digital conversion and digital synchronization.

Voltage regulators (not shown) of the second transmitter assembly 152 conditions unregulated voltage from the receiver 158 so that all components of the second transmitter assembly 152 operate within a proper voltage range. The receiver 158 may also time stamp the single stream of digital data 166 and transmit the single stream of digital data 166 over a high speed serial bus. In addition to the single stream of digital data 166, the receiver 158 may also receive settings from the second transmitter assembly 152, sensor tags, board temperature data, etc. In particular configurations, at least a portion of the discrete analog signals 116 from the Strain sensors 114 may be transmitted across the slip ring 108 to the data acquisition system 110 without being converted to a digital signal. In various embodiments of the present invention, both the first and the second transmitter assemblies 150, 152 are operated simultaneously as described and illustrated above and in FIGS. 2 through 6.

Figure 7:
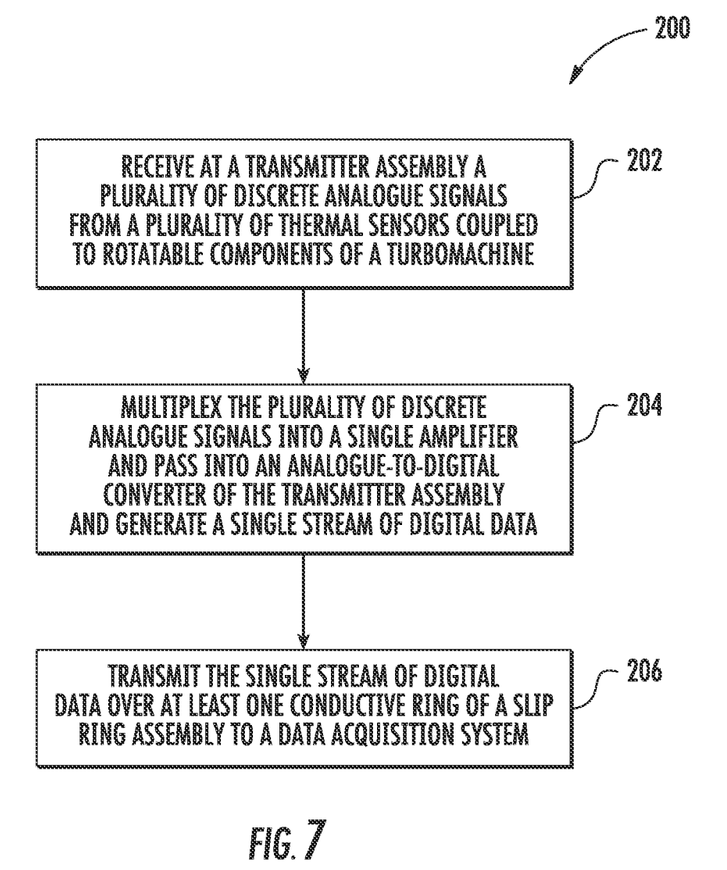
FIG. 7 provides a block diagram of an exemplary method for transmitting sensor data from a rotating component of a turbomachine according to one embodiment of the present invention.

One of ordinary skill in the art will readily appreciate that the system 100 described illustrated with respect to FIGS. 3 through 6 may provide a method for transmitting data from a rotating component of a turbomachine such as a gas turbine 10 as shown in FIG. 1. FIG. 7 provides a block diagram of an exemplary method 200 for transmitting sensor data from a rotating component of a turbomachine.

As shown in FIG. 7 at 202, method 200 generally includes receiving at a transmitter assembly a plurality of discrete analogue signals 120 from a plurality of the thermal sensors 118. At 204, method 200 includes multiplexing the plurality of discrete analogue signals 120 into a single amplifier and an analogue-to-digital converter of the transmitter assembly 150 to generate a single stream of digital data 156. At 206, method 200 includes transmitting the single stream of digital data 156 over at least one conductive ring 142 of the slip ring assembly 108 to the receiver 158 of the data acquisition system 110. In particular embodiments, the single stream of digital data 156 may be transmitted at a data rate of less than 10 Mbit/s. At 208, method 200 includes decoding via the receiver 158 and/or the data acquisition system 110 the single stream of digital data 156 into individual channels 160 that correspond to the original values of the analog thermal data signals 120.

In one embodiment, method 200 may further include converting the discrete analog signals 120 from the thermal sensors 118 to a digital value of 0-2.3 volts. In one embodiment, method 200 may include determining a sample rate of the thermal sensors 118. Method 200 may also include transmitting the low speed system clock signal 162 through one or more of the slip ring conductive rings 142 to the first transmitter assembly 150, transforming the low speed clock signal 162 to a specified high speed clock value via the first transmitter assembly 150 and using the high speed clock value for the analogue-to-digital conversion and/or for digital synchronization. In particular embodiments, method 200 includes providing unregulated voltage to the first transmitter assembly via the data acquisition system 110 and conditioning the unregulated voltage at the first assembly. In one embodiment, method 200 further includes time stamping the single stream of digital data 156. In one embodiment, method 200 further includes transmitting the single stream of digital data 156 over a Modbus protocol. In particular embodiments, the settings of the transmitter assembly 150, sensor tags, cold junction correction data, etc., may also be transmitted to the data acquisition system 110 via the slip ring assembly 108.

Figure 8:
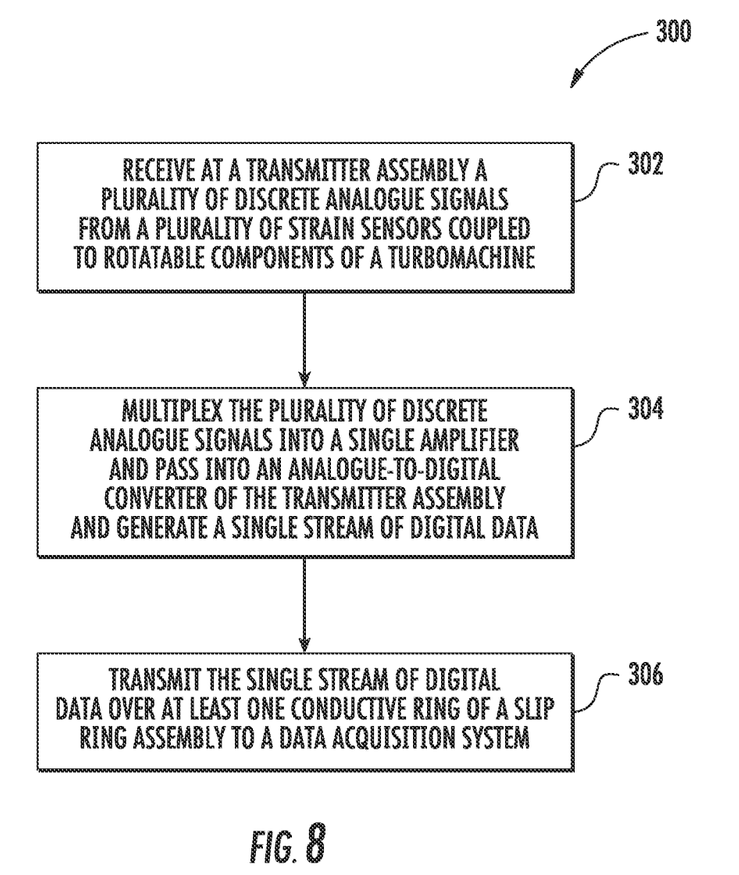
FIG. 8 provides a block diagram of an exemplary method for transmitting sensor data from a rotating component of a turbomachine according to one embodiment of the present invention.

FIG. 8 provides a block diagram of an exemplary method 300 for transmitting sensor data from a rotating component of a turbomachine. As shown in FIG. 8 at 302, method 300 generally includes receiving at transmitter assembly 152 a plurality of discrete analogue signals 116 from a plurality of the strain sensors 114. At 304, method 300 includes providing individual balanced constant current sources to individual channels of the second transmitter assembly 152 that are related to each individual strain sensor 114 that is linked to the second transmitter assembly 152. At 306, method 300 includes multiplexing the discrete analog signals 116 from the strain sensors 114 into a single amplifier and an analogue-to-digital convertor of the second transmitter assembly 152. This results in the single stream of digital data 166. At 308, method 300 includes transmitting the single stream of digital data 166 over at least one conductive ring 142 of the slip ring assembly 108 to the receiver 158 of the data acquisition system 110. In one embodiment, the single stream of digital data 166 may be transmitted at a data rate of at least 10 Mbit/s. At 310, method 300 includes decoding the single stream of digital data 166 into individual channels 168, wherein the individual channels 168 correspond to the original values of the discrete analog signals 116 from the strain sensors 114.

In further embodiments, method 300 includes transmitting via the receiver 158 a low speed system clock signal 170 through a conductive ring 142 of the slip ring assembly 108 to the transmitter assembly 152 and transforming the low speed clock signal 170 via the second transmitter assembly 152 to a specified high speed clock that is used for the analogue-to-digital conversion and digital synchronization.

In particular embodiments, method 300 includes conditioning unregulated voltage flowing from the receiver 158 to the second transmitter assembly 152 via voltage regulators (not shown) of the second transmitter assembly 152 so that all components of the second transmitter assembly 152 operate within a proper voltage range. In particular embodiments, method 300 may include time stamping the single stream of digital data 166. In particular embodiments, method 300 may include transmitting the single stream of digital data 166 over a high speed serial bus. In various embodiments, method 300 may include receiving at the receiver 158 at least one of settings from the second transmitter assembly 152, sensor tags, board temperature data, etc. In particular configurations, method 300 includes transmitting one or more discrete analog signals 116 from the strain sensors 114 to the data acquisition system 110 via a conductive ring 142 without being converted to a digital signal.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal languages of the claims.

What is claimed is:

1. A system for transmitting sensor data from a rotating component of a turbomachine, comprising:
   a plurality of thermal sensors, each thermal sensor coupled to a corresponding rotatable component within the turbomachine, wherein each thermal sensor generates a discrete analogue signal indicative of temperature at the corresponding rotatable component;
   a plurality of transmitter assemblies annularly arranged within a carrier shaft and coupled to an end of a rotor shaft of the turbomachine, the plurality of transmitter assemblies comprising a first transmitter assembly and a second transmitter assembly, the first transmitter assembly configured to receive the discrete analogue signals from the plurality of thermal sensors, wherein first transmitter assembly multiplexes the plurality of discrete analogue signals into a single amplifier and an analogue-to-digital converter to generate a single stream of digital data therefrom; and
   a slip ring assembly electronically coupled to the first transmitter assembly and to a data acquisition system, the slip ring assembly having a plurality of conductive rings, wherein at least one of the conductive rings defines a digital signal path between the first transmitter assembly and the data acquisition system;
   wherein at least one conductive ring of the slip ring transmits a low speed system clock signal through a respective transmitter assembly of the plurality of transmitter assemblies, wherein the respective transmitter assembly transforms the low speed clock signal to a specified high speed clock value using a high speed clock value for at least one of analogue-to-digital conversion and digital synchronization.

2. The system as in claim 1, wherein the plurality of thermal sensors comprise at least one of a thermocouple and a resistance temperature detector.

3. The system as in claim 1, wherein the first transmitter assembly is configured to condition unregulated voltage provided via at least one conductive ring of the slip ring assembly to the first transmitter assembly.

4. The system as in claim 1, wherein the data acquisition system is configured to generate a time stamp associated with the single stream of digital data from the first transmitter assembly.

5. The system as in claim 1, wherein the data acquisition system is configured to decode the single stream of digital data from the first transmitter assembly into individual channels that correspond to the original values of the discrete analogue signals from each thermal sensor.

6. The system as in claim 1, further comprising:
   a plurality of strain sensors, each strain sensor coupled to a corresponding rotatable component within the turbomachine, wherein each strain sensor generates a discrete analogue signal indicative of mechanical strain at the corresponding rotatable component;
   wherein the second transmitter assembly is configured to receive the discrete analogue signals from the strain sensors and to multiplex the plurality of discrete analogue signals into a single amplifier and an analogue-to-digital converter to generate a single stream of digital data therefrom;
   wherein at least one of the conductive rings defines a digital signal path between the second transmitter assembly and the data acquisition system.

7. The system as in claim 6, wherein said plurality of strain sensors comprise at least one of a strain gauge, a pressure gauge and an accelerometer.

8. The system as in claim 6, wherein the second transmitter assembly is configured to condition unregulated voltage provided via at least one conductive ring of the slip ring assembly to the second transmitter assembly.

9. The system as in claim 6, wherein the data acquisition system is configured to generate a time stamp associated with the single stream of digital data from the second transmitter assembly.

10. The system as in claim 6, wherein the data acquisition system is configured to decode the single stream of digital data from the second transmitter assembly into individual channels that correspond to the original values of the discrete analogue signals from each strain sensor.

11. A method for transmitting sensor data from a rotating component of a turbomachine, comprising:
    receiving at a transmitter assembly a plurality of discrete analogue signals from a plurality of thermal sensors, each thermal sensor being coupled to a rotatable component of the turbomachine;
    multiplexing the plurality of discrete analogue signals into a single amplifier and on to an analogue-to-digital converter of the transmitter assembly and generating a single stream of digital data;
    transmitting the single stream of digital data over at least one conductive ring of a slip ring assembly to a data acquisition system; and
    transmitting a low speed system clock signal through at least one conductive ring of the slip ring to the transmitter assembly, transforming the low speed clock signal to a specified high speed clock value via the transmitter assembly and using the high speed clock value for at least one of analogue-to-digital conversion and digital synchronization.

12. The method as in claim 11, wherein the single stream of digital data is transmitted at a data rate of less than 10 Mbit/s.

13. The method as in claim 11, further including decoding via the data acquisition system the single stream of digital data from the transmitter assembly into individual channels that correspond to original values of the discrete analogue signals from the plurality of thermal sensors.

14. The method as in claim 11, further including converting the discrete analog signals from the thermal sensors to a digital value of between 0-2.3 volts.

15. A method for transmitting sensor data from a rotating component of a turbomachine, comprising:
    receiving at a transmitter assembly a plurality of discrete analogue signals from a plurality of strain sensors, each strain sensor being coupled to a rotatable component of the turbomachine;
    multiplexing the plurality of discrete analogue signals into a single amplifier and into an analogue-to-digital converter of the transmitter assembly and generating a single stream of digital data therefrom;
    transmitting the single stream of digital data over at least one conductive ring of a slip ring assembly to a data acquisition system; and
    transmitting a low speed system clock signal through at least one conductive ring of the slip ring assembly to the transmitter assembly, transforming the low speed clock signal to a specified high speed clock value via the transmitter assembly and using the high speed clock value for at least one of analogue-to-digital conversion and digital synchronization.

16. The method as in claim 15, wherein the single stream of digital data is transmitted at a data rate of greater than 10 Mbit/s.

17. The method as in claim 15, further including decoding via the data acquisition system the single stream of digital data from the transmitter assembly into individual channels that correspond to original values of the discrete analogue signals from the plurality of strain sensors.

18. The method as in claim 15, further including converting the discrete analog signals from the thermal sensors to a digital value of between 2.6 and 5 volts.

* * * * *